United States Patent
Chini et al.

(10) Patent No.: US 10,669,199 B2
(45) Date of Patent: Jun. 2, 2020

(54) PROCESS FOR MANUFACTURING HIGHLY POROUS SLAKED LIME AND PRODUCT THEREBY OBTAINED

(71) Applicant: S. A. Lhoist Recherche et Developpement, Ottignies-Louvain-la-Neuve (BE)

(72) Inventors: Stephan Chini, Wulfrath (DE); Marion Lorgouilloux, Strepy Bracquegnies (BE); Olivier Nyssen, Ghlin (BE); Olivier Francoisse, Ceroux-Mousty (BE)

(73) Assignee: S. A. Lhoist Recherche et Developpement, Ottignies-Louvain-la-Neuve (BE)

( * ) Notice: Subject to any disclaimer, the term of this patent is extended or adjusted under 35 U.S.C. 154(b) by 17 days.

(21) Appl. No.: 15/578,581

(22) PCT Filed: Aug. 12, 2016

(86) PCT No.: PCT/EP2016/069211
§ 371 (c)(1),
(2) Date: Nov. 30, 2017

(87) PCT Pub. No.: WO2017/029209
PCT Pub. Date: Feb. 23, 2017

(65) Prior Publication Data
US 2018/0155240 A1 Jun. 7, 2018

(30) Foreign Application Priority Data
Aug. 14, 2015 (EP) ...................................... 15181104

(51) Int. Cl.
*C04B 2/04* (2006.01)
*C01F 11/02* (2006.01)
(Continued)

(52) U.S. Cl.
CPC ................ *C04B 2/04* (2013.01); *C01F 11/02* (2013.01); *C04B 2/06* (2013.01); *C04B 2/08* (2013.01);
(Continued)

(58) Field of Classification Search
CPC ..... C04B 2/04; C04B 2/08; C04B 2/06; C01F 11/02; C01P 2006/16; C01P 2006/14; C01P 2006/12
See application file for complete search history.

(56) References Cited

U.S. PATENT DOCUMENTS

| 1,350,534 A | 8/1920 | Weber |
| 3,366,450 A | 1/1968 | Waldeck |

(Continued)

FOREIGN PATENT DOCUMENTS

| CN | 103626216 A | 3/2014 |
| GB | 1352875 A | 5/1974 |

(Continued)

*Primary Examiner* — Anthony J Zimmer
(74) *Attorney, Agent, or Firm* — Whitaker Chalk Swindle & Schwartz PLLC; Charles D. Gunter, Jr.

(57) ABSTRACT

Process for manufacturing highly porous slake lime comprising a feeding step of quicklime, a feeding step of water in a feeding zone of a hydrator, a slaking step of said quicklime in a slaking zone of said hydrator and a maturation step in a maturation zone of said hydrator to form slaked lime.

15 Claims, 4 Drawing Sheets

(51) Int. Cl.
*C04B 2/06* (2006.01)
*C04B 2/08* (2006.01)

(52) U.S. Cl.
CPC ...... *C01P 2006/12* (2013.01); *C01P 2006/14* (2013.01); *C01P 2006/16* (2013.01)

(56) References Cited

U.S. PATENT DOCUMENTS

| | | | |
|---|---|---|---|
| 3,573,002 A * | 3/1971 | Zimmerman et al. .... | C04B 2/08 422/162 |
| 4,636,379 A | 1/1987 | Bestek et al. | |
| 5,332,436 A | 7/1994 | Walker, Jr. et al. | |
| 6,322,769 B1 * | 11/2001 | Langelin .............. | B01D 53/508 423/635 |
| 2009/0246117 A1 | 10/2009 | Tilquin et al. | |

FOREIGN PATENT DOCUMENTS

| | | |
|---|---|---|
| JP | 2008290940 A | 12/2008 |
| JP | 2015131750 A | 7/2015 |
| RU | 2166485 C1 | 5/2001 |
| SU | 35644 A1 | 3/1934 |
| SU | 1463724 A1 | 3/1989 |
| WO | 9714650 A1 | 4/1997 |

\* cited by examiner

PROCESS FOR MANUFACTURING HIGHLY POROUS SLAKED LIME AND PRODUCT THEREBY OBTAINED

The present invention relates to a process for manufacturing highly porous slaked lime comprising a feeding step of quicklime, a feeding step of water in a feeding zone of a hydrator, a slaking step of said quicklime in a slaking zone of said hydrator and a maturation step in a maturation zone of said hydrator to form slaked lime.

By quicklime, it is meant a mineral solid material for which the chemical composition is mainly calcium oxide, CaO. Quicklime is usually obtained by calcination of limestone (mainly $CaCO_3$).

Quicklime may also contain impurities, such as magnesium oxide, MgO, sulfur oxide, $SO_3$, silica, $SiO_2$ or even alumina, $Al_2O_3$, . . . , the sum of which being at a level of some %. The impurities are expressed herein under their oxide form, but of course, they might appear under different phases. Quicklime contains generally also some % of residual limestone, called unburned residues.

The quicklime suitable according to the present invention may comprise MgO at an amount, expressed under MgO form, comprised in the range of 0.5 to 10 weight %, preferably equal to or lower than 5 weight %, more preferably equal to or lower than 3 weight %, most preferably equal to or lower than 1 weight % with respect to the total weight of the quicklime.

The $CO_2$ content of the quicklime (representing the unburned limestone, amongst other) is preferably equal to or lower than 3 weight %, preferably equal to or lower than 2%, more preferably equal to or lower than 1 weight % with respect to the weight of quicklime.

The $SO_3$ content (sulfur expressed as $SO_3$ equivalent) of the quicklime is equal to or lower than 1 weight %, preferably equal to or lower than 0.5 weight %, more preferably equal to or lower than 0.2 weight % with respect to the weight of quicklime.

Typically, to form slaked lime, also sometimes called hydrate, quicklime is provided in presence of water. Calcium oxide from the quicklime reacts quickly with water to form calcium di-hydroxide $Ca(OH)_2$, under the form of slaked lime or hydrated lime, in a reaction called hydration or slaking reaction which is very exothermic. In the following, calcium di-hydroxide will be simply called calcium hydroxide.

The slaked lime may therefore contain the same impurities than the quicklime from which it is produced.

The slaked lime may also comprise calcium oxide, which might not have been entirely hydrated during the slaking step, or calcium carbonate $CaCO_3$. The calcium carbonate can be originated from the original limestone (unburned) from which said slaked lime is obtained (via calcium oxide) or being the result of a partial carbonation reaction of slaked lime through the contact with an atmosphere containing $CO_2$.

The amount of calcium oxide in the slaked lime according to the present invention is typically equal to or lower than 3 weight %, preferably equal to or lower than 2 weight % and more preferably equal to or lower than 1 weight % with respect to the total weight of the slaked lime. The amount of $CO_2$ in slaked lime (mainly under the form of $CaCO_3$) according to the present invention is equal to or lower than 4.5 weight %, preferably equal to or lower than 3 weight %, more preferably equal to or lower than 2 weight %, with respect to the total weight of the slaked lime according to the present invention.

One of the most common industrial processes for manufacturing slaked lime is called «dry slaking mode» which produces standard slaked lime commonly presenting a BET specific surface area between 12 and 20 $m^2/g$. In this process, the water is added into a hydrator at an amount limited to the one which is necessary for fully hydrating the quicklime, taking into account that some of which will evaporate during the slaking reaction, due to the exothermic character of such reaction. At the exit of the hydrator, the resulting slaked lime product is already in a powdery state and comprises generally less than 2 weight %, even less than 1.5 weight % of humidity (also called moisture or free water).

The slaking reaction is thus performed in the hydrator, in which quicklime is fed upstream of the slaking direction, meaning the direction along which lime is transported along and into the hydrator. Slaked lime is withdrawn downstream the slaking direction. Transportation means, such as a horizontal shaft equipped with mixing paddles for example, allow the transportation of lime along the slaking direction into the hydrator, from the quicklime feeding until the slaked lime withdrawal. The transportation means allow also homogeneous mixture of lime undergoing hydration and therefore improves the contact between water and lime into the hydrator and avoids the formation of hot spots.

An hydrator can be divided in three main consecutive zones. The first one is called the feeding or mixing zone and constitutes the part of the hydrator located upstream the slaking direction, in which quicklime and water are fed and mixed together. The second zone, called slaking zone, represents the part of the hydrator in which the slaking reaction mostly occurs, meaning in which most of quicklime CaO is chemically converted into slaked lime $Ca(OH)_2$ and in which most of the vapor is generated, notably due to this exothermic reaction. The third zone, called maturation or finishing zone, is located downstream the slaking direction and constitutes the part of the hydrator which ensures that the particles are fully slaked and which allows homogenizing the residual moisture content of the slaked lime.

Different kinds of hydration process and hydrator exist, depending on the properties of the quicklime used, but also on the expected yield of the slaking reaction and on the desired properties of the resulting slaked lime.

In order to reach good hydration yield, several parameters shall be taken into account, such as the residence time of the lime in the hydrator, the water reactivity of the quicklime, the location of the quicklime feeding along the hydrator, but also the amount of water with respect to the lime amount.

The water reactivity of quicklime is generally characterized and measured by the procedure given in the European standard EN459-2 and is often quantified by the value $t_{60}$, being the necessary time to reach a temperature of 60° C. for a water volume of 600 $cm^3$ initially at 20° C., with the addition of 150 g of quicklime.

During hydration of quicklime, more or less fine particles are produced, depending on the particle size of the starting quicklime being fed, but also depending on the speed of the hydration reaction, which latter is explosive and generates cracked and exploded small particles. A well-controlled reaction allows therefore to produce the whished particle size (from fine particles to generation of lime grains, being particles agglomerated together) as well as the wished porosity. In this perspective, the temperature inside the hydration or slaking zone is also a key factor governing the hydration reaction.

In the past, classical slaked lime, i.e. presenting a BET specific surface area between 12 and 20 $m^2/g$, was typically produced into single stage hydrators. However, with this kind of hydrator, due notably to the short residence time of the lime inside the hydrator, it was difficult to properly adjust the amount of water to be added so as to obtain a fully slaked lime while staying in the desired moisture range in order to avoid clogging and collapsing during the slaking process.

One of the major development of the dry slaking process resided in the arrival of the multi stages hydrator, with two or more stages, typically three stages, usually superimposed.

In a three stages hydrator, for example, the first stage is globally used for feeding and mixing water and lime, and part of the hydration reaction may begin. The main part of the slaking reaction occurs in the second stage, where the water mixed with lime and not yet consumed by the hydration reaction reacts with lime and where most of the vapor is generated. The last stage is globally used to mature the slaked lime (meaning ensuring that the particles are fully slaked).

The multi stages hydrator is therefore more flexible, notably because it allows a longer residence time of the lime inside the hydrator, but also because the process parameters (like the mixing speed, the design of the paddles, the weir level, . . . ) can be adjusted in each stage independently, allowing therefore a certain degree of adaptation of the process to different grades of quicklimes and more flexibility concerning the water/lime ratio used for hydration.

In a particular three stages hydrator, the mixing zone is located in the first stage, the slaking zone in the second stage and the maturation zone in the third stage.

Such process is known from the prior art, such as the one disclosed in "*Lime and Limestone. Chemistry and Technology, Production and Uses*", J. A. H. Oates, 1998, pages 216-218. Standard slaked limes produced by the above mentioned processes are typically used in a lot of industrial applications, like water treatment, sludge conditioning, flue gas cleaning, agriculture, construction, etc.

For some of those applications, the properties of the slaked lime are particularly critical for achieving good performance. For example, in the flue gas cleaning, lime is used as a sorbent of several gaseous pollutants. However, such lime, once having captured those pollutants, is a by-product that needs to be treated or recycled. Therefore, the industrials are looking for high performing product in order to reduce the amount of by-product, the treatment of which being expensive. Hence, during the past years, more and more products and manufacturing processes were developed in order to control the properties of slaked lime, notably its particle size, pore volume and specific surface area, in order to improve their capture performance.

A way to increase the performance of lime consists in increasing the proportion of the hydrated lime that will actually enter into contact with the pollutants to capture, by increasing the specific surface area or the pore volume of the hydrated lime. It led during the past decades to the manufacturing of slaked lime with high specific surface area in which the slaking reaction is performed in presence of alcohol.

Relevant examples are disclosed in U.S. Pat. No. 5,492,685, which relates to hydrated lime having high specific surface area and small particle size, prepared by hydrating lime with an aqueous hydration solution of an organic solvent (like alcohol), and preferably washing the resulting hydrate with an aqueous solution of an organic solvent prior to drying. The resulting high specific surface area hydrated limes according to this document are disclosed as being excellent sorbents for $SO_2$ removal from flue gases and present specific surface areas that are typically of more than 35 $m^2/g$, preferably greater than 55 $m^2/g$ or even up to 85 $m^2/g$.

To reach those high specific surface areas, use is made of ratios of alcohol to water in excess of 5:1, especially with highly reactive quicklimes.

In the disclosed process for manufacturing hydrated lime with high specific surface area, thorough mixing of the hydration solution and the lime is important. High speed, intensive mixing is very helpful, and is disclosed as being necessary with very reactive limes, for good heat transfer. For extremely reactive limes, this document teaches a cooling step of the mixing vessel. An alternative approach which is disclosed is to use a split water stream to minimize the rapid temperature rise when a highly reactive lime is processed.

The alcohol or other solvent in the hydration solution is disclosed as retarding the slaking kinetics, and maintains the temperature of the hydration mixture below the boiling point of water (thus preventing or minimizing the degree of gas phase hydration, which would inhibit specific surface area development as notably disclosed in "Surface areas of high-calcium quicklimes and hydrates", H. R. Staley and S. H. Greenfeld, *American Society for testing materials,* 1947, vol. 47, pages 953-964).

Several plants are disclosed to carry out the disclosed process, wherein each time the temperature control, the mixing conditions control, the preheating steps and the residence time are key to reach the desired properties of the final product.

By the alcohol method, in which quicklime is slaked in the presence of a large quantity of alcohol, a hydrated lime is prepared characterized by a small particle size distribution (less than 20 μm), a large specific surface area (greater than 30 $m^2/g$) and a low water content but which however contains alcohol (the complete elimination of this latter being impossible). Moreover, this method requires an expensive installation because it is necessary to recycle to a maximum the used alcohol.

Therefore other kinds of slaked limes, with high specific surface area and high pore volume have been developed. One way, which has been further investigated, is disclosed in document WO 97/14650.

The document WO 97/14560 discloses a $Ca(OH)_2$ particle composition and a method of making the composition. The composition consists essentially of dried calcium hydroxide particles having a moisture content of less than 2 percent by weight of the total composition, a specific surface area greater than 30 $m^2/g$, a total nitrogen desorption pore volume of at least 0.1 $cm^3/g$ for pores with a diameter less than 1000 Angstroms. The lime composition is disclosed as providing excellent performance for the cleaning of flue gas in installations comprising a bag filter.

As it can be seen in this document, it is also possible, without adding any organic additive, to reach high specific surface area and high pore volume by controlling the parameters governing the slaking process.

However, the document discloses lab or pilot scale manufacturing, and a process where the operation is just represented by boxes. Moreover, during the last decades, the environmental legislations have generally been drastically strengthened, in terms of quantity of pollutant authorized in flue gases and in terms of the treatment of the by-product, forcing therefore the industrials to find solutions with improved sorbent capacity.

In this perspective, the composition and the process of WO 97/14650 should be improved in terms of efficiency, so as to comply with the new specifications, but also in terms of implementation.

There is therefore a need to reach a way to manufacture highly porous slaked lime, with improved sorbing capacities, being industrially feasible, meaning not requiring too much human intervention to control the process and which is reproducible to be able to maintain the properties of the slaked lime product over time.

The present invention intends to provide a solution to this need by specifying and improving the manufacturing conditions of slaked lime with high porosity features, those latter being reproducible and sustainable over time.

To this end, it is provided according to the present invention, a process, as mentioned in the beginning, characterized in that said feeding step of quicklime and said feeding step of water are performed so as to obtain a water/quicklime ratio comprised between 0.8 and 1.3 by weight, preferably between 0.9 and 1.2 and more preferably close to 1 (the extreme values being included), the process further comprising a step of removing vapor generated during said slaking step, said step of removing vapor being performed substantially along said slaking zone to form a raw highly porous slaked lime being a high specific surface area and high pore volume slaked lime.

It has been indeed shown according to the present invention that the combination of the control of the water/quicklime ratio, together with the removal of steam (water vapor) generated allows to reach a specific and reproducible quality of slaked lime with high porosity features, together with a high production yield by avoiding clogging during the slaking process.

The water/lime ratio should be adapted to get a raw slaked lime whose moisture content is between 15 and 30 weight %, preferably between 20 and 25 weight % with respect to the weight of the raw slaked lime. This water/lime ratio should also be adapted with the nature (reactivity towards water, particle size, . . . ) of the quicklime to be slaked and the slaked lime desired specific surface area and pore volume parameters.

By removing the generated steam substantially along said slaking zone, the contact between steam and lime at this stage, which is detrimental to the porosity properties of slaked lime, is avoided. This also enables keeping the content of water under control, by avoiding the condensation of steam in the cold parts of the hydrator, which otherwise might have caused clogging of the hydrator by formation of lime putty.

By "removing the generated steam substantially along said slaking zone" it is understood that the vapor removal is performed over 80% to 300% of the length of the slaking zone, preferentially over 90% or more of the length of the slaking zone, more preferably over 100% or more of the length of the slaking zone.

According to the present invention, it has been found that removing steam along the slaking zone, meaning substantially over the entire length of the slaking zone of the hydrator (being a multi stages or a single stage hydrator) is a key factor of success to reach slaked lime with controlled and homogeneous porosity features.

Moreover because of the lime/water ratio used in the process according to the present invention, said highly porous slaked lime obtained by the process has a high BET specific surface area being very homogenous, reproducible and stable from a production campaign to another and being comprised between 30 m²/g and 50 m²/g, preferably higher or equal to 32 m²/g, more preferably higher or equal to 35 m²/g, more particularly higher or equal to 38 m²/g such as for instance higher or equal to 40 m²/g and typically lower than or equal to 48 m²/g.

Similarly, said highly porous slaked lime obtained by the process according to the present invention has a total BJH pore volume very reproducible and stable from a production campaign to another, composed by the pores with a diameter less than 1000 Angstroms, higher than or equal to 0.15 cm³/g, preferably higher than or equal to 0.17 cm³/g, advantageously higher than or equal to 0.18 cm³/g, in particular higher than or equal to 0.20 cm³/g and typically lower than 0.3 cm³/g, in particular lower than 0.28 cm³/g.

Alternatively, highly porous slaked lime obtained by the process according to the present invention has a partial BJH pore volume very reproducible and stable from a production campaign to another, composed by the pores with a diameter ranking from 100 Angstroms to 300 Angstroms, higher or equal to 0.07 cm³/g, preferably higher than or equal to 0.10 cm³/g, advantageously higher than or equal to 0.11 cm³/g, in particular higher than or equal to 0.12 cm³/g and typically lower than 0.15 cm³/g, in particular lower than 0.14 cm³/g.

Alternatively, highly porous slaked lime obtained by the process according to the present invention has a partial BJH pore volume very reproducible and stable from a production campaign to another, composed by the pores with a diameter ranking from 100 Angstroms to 400 Angstroms, higher or equal to 0.09 cm³/g, preferably higher than or equal to 0.12 cm³/g, advantageously higher than or equal to 0.13 cm³/g, in particular higher than or equal to 0.14 cm³/g and typically lower than 0.17 cm³/g, in particular lower than 0.16 cm³/g.

By the expression BET specific surface area, it is meant in the meaning of the present specification the specific surface area measured, by manometry with adsorption of nitrogen at 77 K after degassing in vacuo at a temperature comprised between 150 and 250° C., notably at 190° C. for at least 2 hours, on a slaked lime that has been previously dried (for example in a thermoscale such as in an infrared moisture analyzer, until the weight of the resulting powder does not vary of more than 2 mg for at least 20 seconds), and calculated according to the multipoint BET method as described in the ISO 9277:2010E standard.

By the terms BJH pore volume according to the present invention, it is meant the pore volume as measured by manometry with adsorption of nitrogen at 77 K after degassing in vacuo at a temperature comprised between 150 and 250° C., notably at 190° C. for at least 2 hours, on a slaked lime that has been previously dried (for example in a thermoscale, such as in an infrared moisture analyzer, until the weight of the resulting powder does not vary of more than 2 mg for at least seconds), and calculated according to the BJH method, using the desorption curve.

In a particular embodiment, the process of the present invention further comprises a drying step of said raw slaked lime to form a dried powdery high specific surface area and high pore volume slaked lime.

The slaking step can be performed into a single stage or multistages hydrator.

In the case of a multistages hydrator, said hydrator is preferably a three stages hydrator, wherein, preferably, the mixing zone is located in the first stage, the slaking zone in the second stage and the maturation zone in the third stage.

In this particular embodiment, the first stage can be shifted from the two other stages so as to facilitate the access to the slaking zone for removing the vapor.

Preferably, according to the present invention, said slaking step of said quicklime is performed into a single stage hydrator, meaning that the hydrator used for the manufacturing process is a single stage hydrator.

It is indeed preferred according to the process of the present invention, against all expectations to use a single stage hydrator, even if nowadays, multi stages hydrators are usually preferred for their higher residence time, allowing therefore to use less reactive and/or coarser fractions of quicklime, while being more flexible in terms of water injection point and allowing a higher tolerance of water/lime ratio adjustment to produce a standard slaked lime with a desired moisture range.

According to the present invention, the use of a single stage hydrator makes the removing step of steam easier, said step being crucial for the present invention. Indeed, in the present invention, the contact between the steam and the lime should be avoided or at least limited to a time as short as possible in order to maintain high specific surface area and high pore volume of the so-formed slaked me.

For this reason, the single stage hydrator is preferred according to the present invention since being, contrarily to what might have been thought, more convenient and perfectly adapted for producing a highly porous slaked lime with high BET specific surface area and high BM pore volume.

Indeed, even if multi stages hydrators are advantageously used nowadays to produce standard hydrated limes due to their higher flexibility, it has been realized that the single stage hydrator is specifically more adapted to a process like the one of the present invention where humidity may reach 30% since, as already mentioned, the single stage hydrator facilitates the steam extraction and will also not face the clogging issues that will be encountered between the different stages of a multi stages hydrator, due to the high moisture content of the hydrate.

Typically, the vapor removal in a hydrator can be performed through either a wet or a dry technology using respectively a wet scrubber or a fabric filter, usually a bag house filter.

Advantageously, in the process according to the present invention, said step of removing vapor is performed through a fabric filter, in particular a baghouse filter.

Indeed, the fabric filter allows separating from the vapor stream the dust produced during the slaking step while at the same time injecting independently the slaking water at a controlled and relatively low temperature, preferably at the beginning of the hydrator, allowing therefore to better control the hydration temperature. This leads to a more stable slaking reaction process and a better development of the slaked lime porosity.

Moreover, the fabric filter should extend as much as possible over the entire length of the slaking zone in order to ensure the removal of steam close to its production by the exothermic slaking reaction, and therefore minimizing the contact time between the steam and the lime, that could be detrimental to the slaked lime porosity. The objective of having a filter extending on the whole length (or maximum length possible) of the slaking zone is to shorten as much as possible the steam path from where it is produced to where it is released in the atmosphere.

To reach steam removal, specific pressure shall be used in order to extract efficiently the steam while reducing as much as possible suction of the fine particles since otherwise the bags of the filter will be quickly clogged and will require too high maintenance costs.

In a preferred embodiment, pressure pulses are applied onto the bags of the filter to inflate and vibrate them and make the particles falling down, back into the hydrator. The pulses might be done by blowing pressurized air into the bags of the filter at regular intervals, in order to avoid clogging and too high pressure drop.

In a particular embodiment, there is a casing in the bags and possibly a trace heating system allowing the heating of the bags, reducing therefore the water condensation on the bags and the dropping of liquid water from the filter into the hydrator, as well as the clogging of the bags.

Preferably, the bags are made from a hydrophobic material and adapted to the steam, temperature and basic nature of the material to be filtered.

In a variant of the process according to the present invention, said feeding step of quicklime is made by a weighing device, such as a conveyor belt, allowing quicklime to fall into the hydrator.

Preferably, the quicklime is dosed gravimetrically (weighing hopper) and the water amount introduced in the hydrator is determined by a weight flow meter.

Before the quicklime falls into the hydrator, it can be advantageous to submit the lime stream to a magnetic field (permanent magnet) aiming at avoiding any metallic parts from entering the hydrator.

Advantageously, the feeding of water is carried out at a single point at the entry of the hydrator, preferably onto the falling quicklime.

It has been indeed found that feeding water at several points located along the length of the hydrator will lead to more hot spots, more vapor production and will increase the risk of clogging.

According to a specific embodiment of the process according to the present invention, said quicklime presents a reactivity towards water $t_{60}$, measured according to the European standard EN 459-2, equal to or greater than 15 seconds and equal to or lower than 10 minutes, preferably equal to or lower than 3 minutes, more preferably equal to or lower than 3 minutes and most preferably equal to or lower than 2 minutes.

Advantageously, said quicklime presents a particle size $d_{98}$ comprised between 90 µm and 10 mm, preferably equal to or lower than 5 mm, more preferably equal to or lower than 2 mm. The notation $d_{98}$ represents a diameter, expressed in mm, relative to which 98% by weight of the particles measured are smaller.

According to the present invention, the particle size should be as small as possible for the homogeneity of the lime and of the reaction, as long as the fineness of the lime does not influence its flowability and does not lead to dosing issues of inaccuracy. Particles with a particle size $d_{98}$ greater than 5 mm can be used as well, provided they have a high reactivity towards water ($t_{60}$ of less than 2 minutes measured according to the European standard EN 459-2), in order to ensure full hydration of quicklime during its residence time in the hydrator.

Preferably, according to the present invention, said water presents a temperature equal to or lower than 60° C., preferably equal to or lower than 40° C., preferably equal to or lower than 20.

The temperature of the water is preferably as low as possible. The water may also comprise some impurities such as chlorides, nitrates, sulfates and/or phosphates. The total amount of the chlorides and nitrates is preferably below 1 g/dm$^3$, more preferably below or equal to 0.5 g/dm$^3$ and most preferably equal to or lower than 0.1 g/dm$^3$. The total amount of the sulfates and phosphates is preferably below 1 g/dm$^3$, more preferably below or equal to 0.5 g/dm3 and most preferably equal to or lower than 0.1 g/dm$^3$.

In a preferred embodiment of the process according to the present invention, during said slaking step, lime is mixed and lifted by a horizontal shaft equipped with mixing paddles. The mixing paddles might be specifically designed in order to ensure the good mixing required to get a reproducible reaction, but also to ensure lifting and raising up of the lime, as well as its movement downstream the slaking direction.

The rotation speed of the shaft equipped with mixing paddles should stay below 30 rpm to avoid the agglomeration of the hydrate, ideally, it is ranking between 10 and 20 rpm.

The filling level of the hydrator might be adjusted to the quicklime reactivity and to the required residence time in the hydrator.

In a preferred embodiment, the hydrator filling level should be adjusted by help for instance of a wear plate at the exit of the hydrator and should be set between 30 and 60% of the hydrator volume (height), ideally close to 50% volume (shaft level).

In a particular embodiment of the process according to the present invention, the residence time of lime in the hydrator is comprised between 20 and 40 minutes, preferably around 30 minutes.

In a particularly preferred embodiment according to the present invention, the temperature in the hydrator is kept below 100° C., preferably between 85 and 99° C., more preferably between 95 and 98° C.

Indeed, as aforementioned, the temperature in the hydrator should not be too high in order to avoid as much as possible steam slaking of quicklime which is detrimental to porosity features, but not too low as well in order to avoid water condensation and formation of a paste into the hydrator, which latter being detrimental to the homogeneity of the lime product and to the plant in itself.

The temperature in the hydrator can notably be controlled by adjusting the water/lime ratio.

In an advantageous embodiment of the process according to the present invention, the manufacturing process of highly porous slaked lime is controlled by measuring the moisture of the raw slaked lime (slaked lime at the exit of the hydrator, before the drying step) or the motor intensity of the shaft equipped with mixing paddles.

The manufacturing process could also be controlled through the temperature measurement, however the temperature control into the hydrator is difficult to carry out with accuracy due to the crust of hydrate that forms around the probes.

In the process according to the present invention, the measurement of the moisture of the raw slaked lime or the motor intensity of the shaft equipped with mixing paddles have been chosen as measurements to control the slaking reaction. Indeed, based on the measurement of moisture or motor intensity, the water flow rate is adjusted. The motor intensity also gives information regarding the moisture content of the raw slaked lime since the higher the moisture content, the more difficult for the mixing shaft to rotate, the higher the intensity of the motor. Both parameters are possible to follow online and allow a quick response and a better control of the slaking reaction.

An increase of the motor intensity corresponds to an increase of the hydrate moisture and indicates that the water flow rate has to be decreased.

In a further particular embodiment according to the present invention, the feeding step of water is a feeding step of water comprising additives, such as but not limited to di-ethylene glycol, alkali metal compound selected from the group consisting of alkali metal hydroxides, carbonates, hydrogencarbonates, and mixtures thereof, for example to favor the development of porosity or capture properties of the slaked lime.

In this case, the temperature of the water must be controlled so as to be not too low in order to avoid precipitation of said additives. For example, in the case of water containing sodium carbonate at a concentration of 10 weight % (i.e. 10 g per 100 g of water), the temperature must not be below 10° C. in order to avoid precipitation.

According to a specific embodiment of the present invention, in the case of a single stage hydrator, the slaking zone extends to at least 30%, preferably 40%, in particular 50%, more preferably 60% of the length of the hydrator.

Other embodiments of the process according to the present invention are mentioned in the appended claims.

The present invention also relates to a lime composition obtained by the process according to the present invention, presenting a reproducible partial BJH pore volume composed by the pores with a diameter ranking from 100 Angstroms to 300 Angstroms, higher or equal to 0.07 cm$^3$/g, preferably higher than or equal to 0.10 cm$^3$/g cm$^3$/g, advantageously higher than or equal to 0.11 cm$^3$/g, in particular higher than or equal to 0.12 cm$^3$/g and typically lower than 0.15 cm$^3$/g, in particular lower than 0.14 cm$^3$/g.

Alternatively, the lime composition obtained by the process according to the present invention presents a reproducible partial BJH pore volume composed by the pores with a diameter ranking from 100 Angstroms to 400 Angstroms, higher or equal to 0.09 cm$^3$/g, preferably higher than or equal to 0.12 cm$^3$/g, advantageously higher than or equal to 0.13 cm$^3$/g, in particular higher than or equal to 0.14 cm$^3$/g and typically lower than 0.17 cm$^3$/g, in particular lower than 0.16 cm$^3$/g.

Other embodiments of the lime composition according to the present invention are mentioned in the appended claims.

Other characteristics and advantages of the present invention will be derived from the non-limitative following description, and by making reference to the drawings and the examples.

In the drawings, the same reference numbers have been allocated to the same or analog element.

The present invention aims thus at removing as soon as possible the vapor generated by the slaking reaction of quicklime so as to avoid the contact between said vapor and the lime, said contact being detrimental to the slaked lime porosity. The vapor is mainly generated in the slaking zone of the hydrator. Therefore, in order to optimize the step of removing vapor according to the process of the present invention, the hydrator (single or multi stage) should be equipped with an extraction hood that preferably extends on 100% of the hydrator length.

Figure 4:
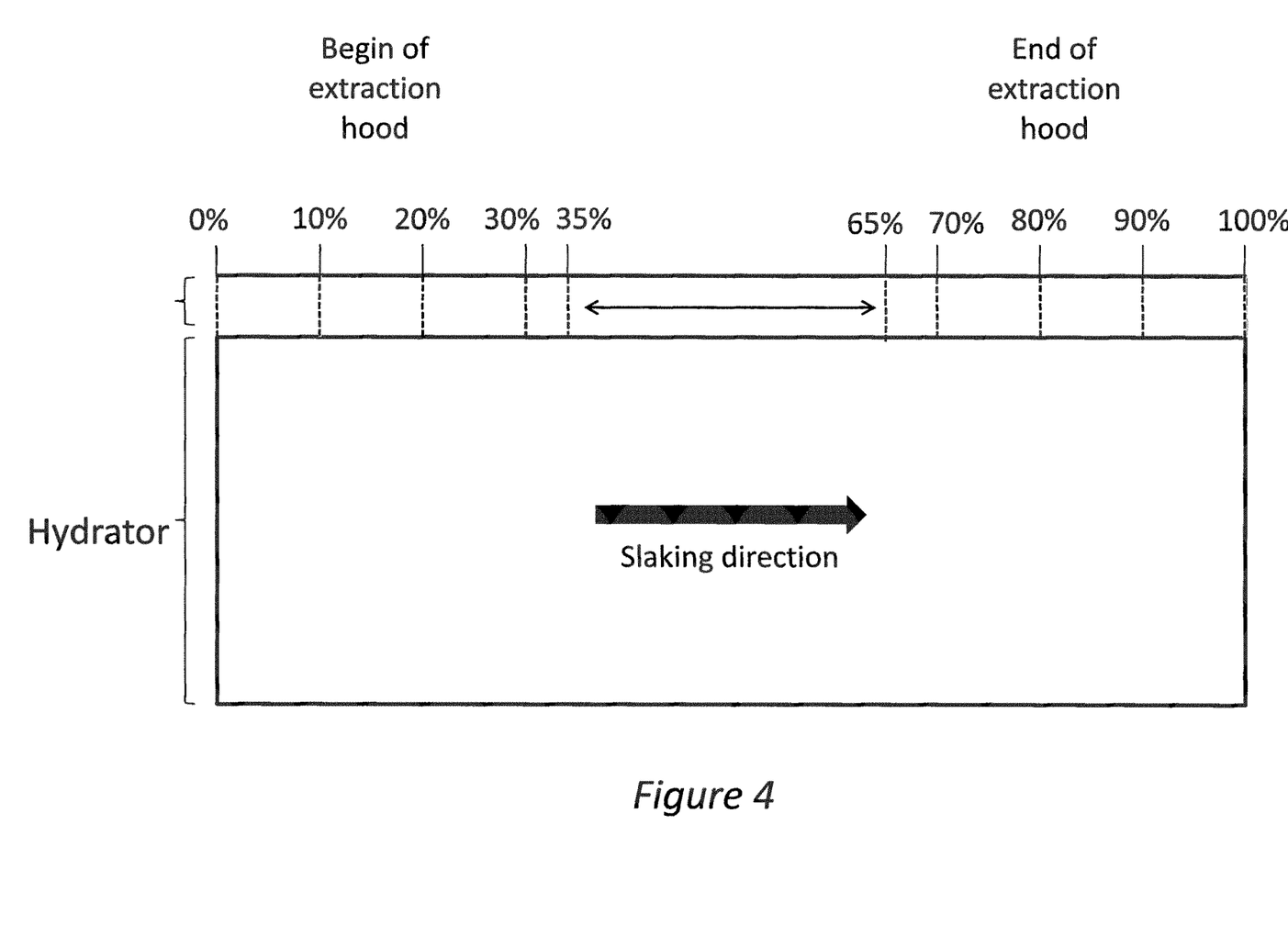
FIG. 4 is a schematic illustration of the length and position of the extraction hood onto a single stage hydrator for performing the process according to the present invention.

Alternatively, said extraction hood should extends on a portion of the hydrator length which starts from 35%, preferentially from at least 30%, preferably 20%, more preferably 10%, in particular 0% of the length of said hydrator, upstream the slaking direction, until at least 65%, preferably 70%, in particular 80%, more preferably 90%, notably 100% of the length of the hydrator (see FIG. 4).

EXAMPLES

Example 1

CFD simulations have been performed so as to illustrate the flow path of water steam generated during a slaking reaction of quicklime with a water/lime ratio between 0.8 and 1.3 depending on the size/section and position of the bag filter onto a single stage hydrator (slaking unit).

Figure 1:
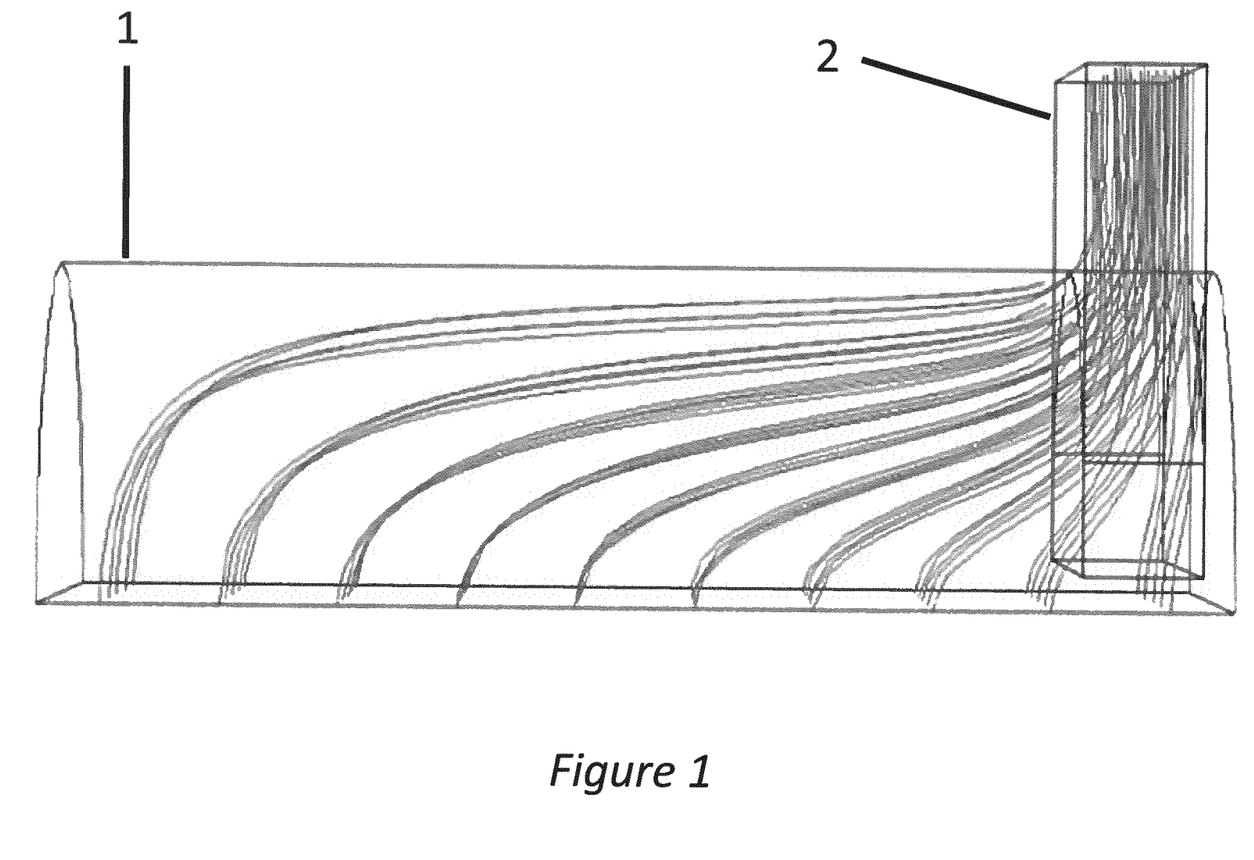
FIG. 1 is a CFD simulation illustrating a single stage hydrator with a small extraction hood section located at the end of the slaking zone of the hydrator.
Figure 2:
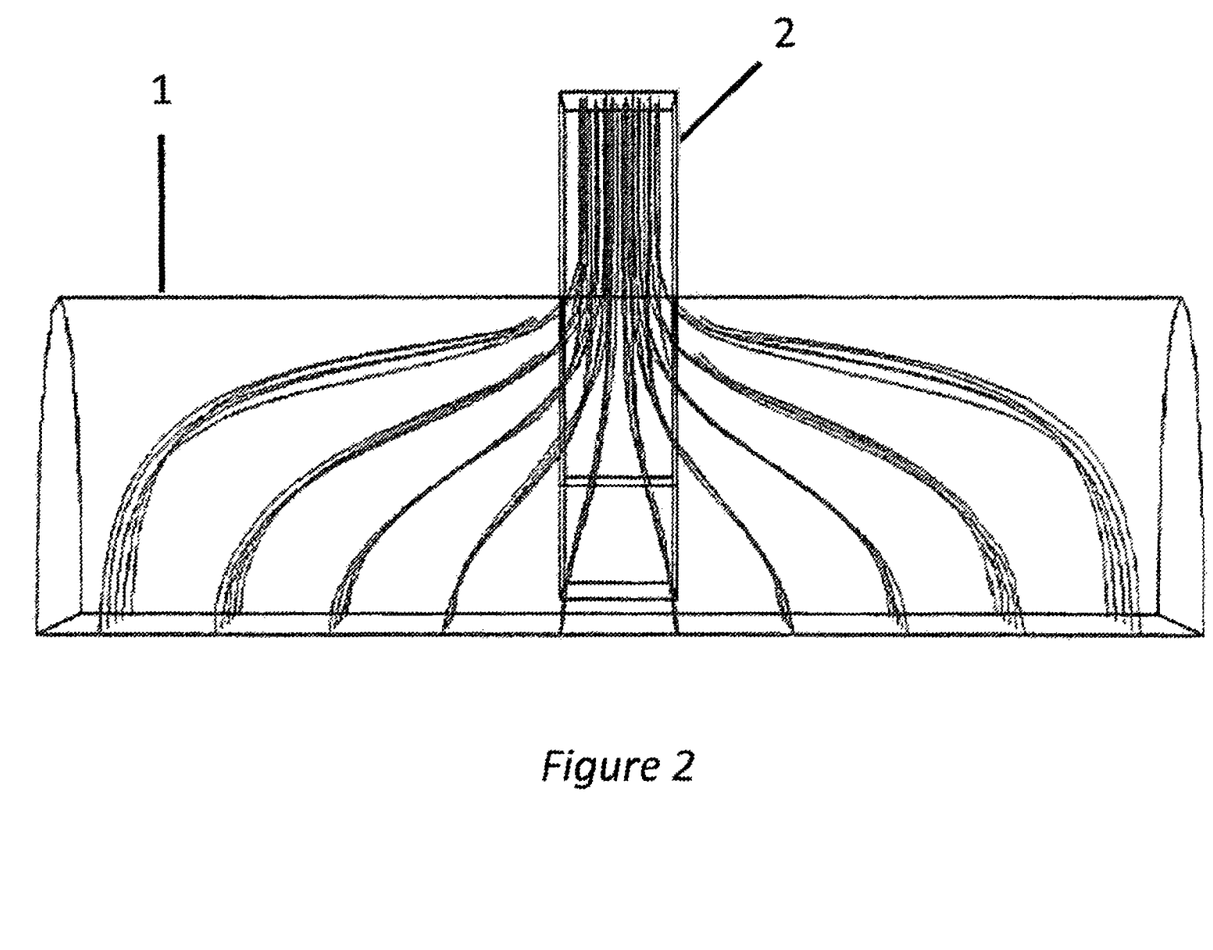
FIG. 2 is a CFD simulation illustrating a single stage hydrator with a small extraction hood section located at the center of the slaking zone of the hydrator.
Figure 3:
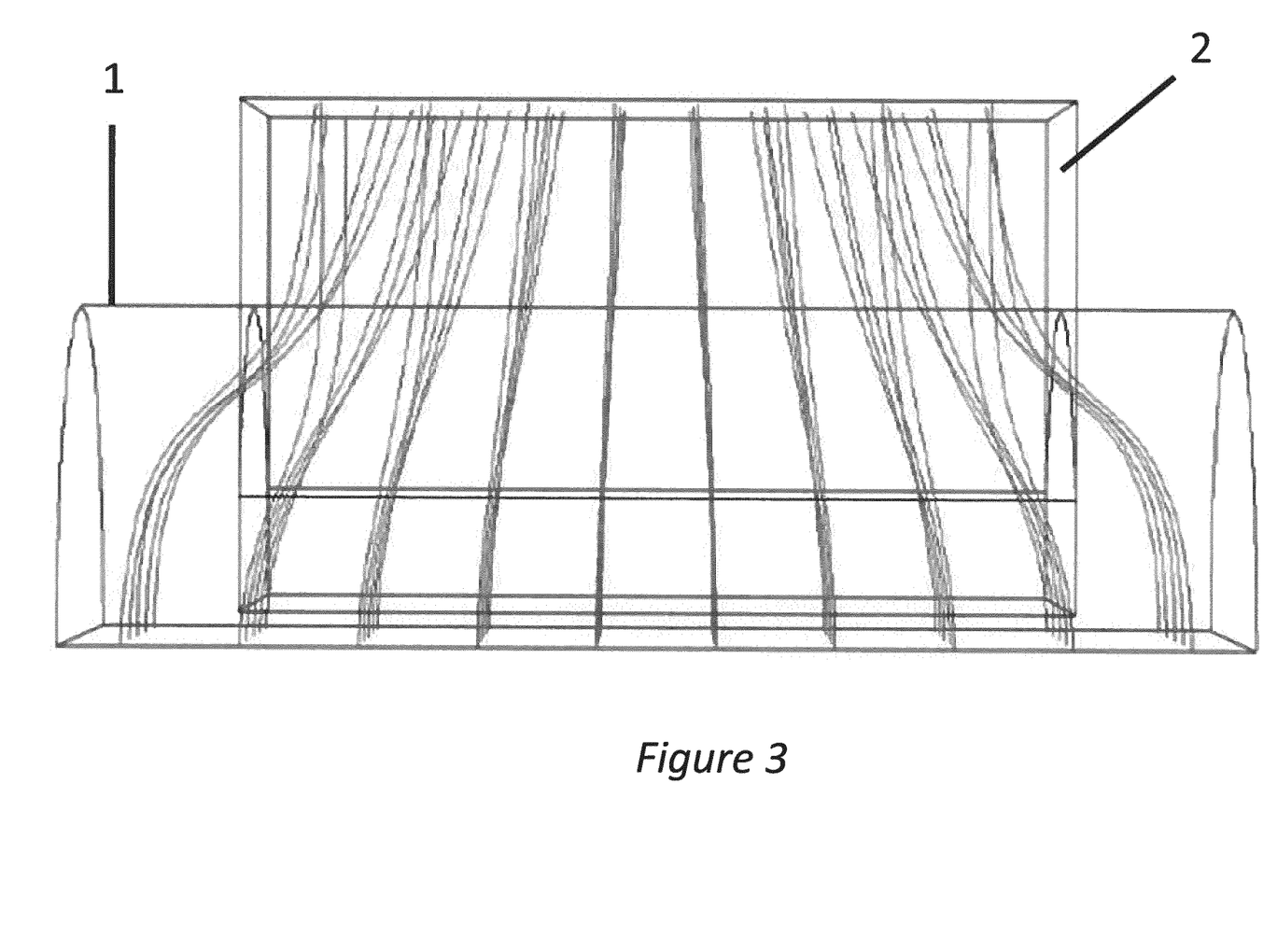
FIG. 3 is a CFD simulation illustrating a single stage hydrator with a long extraction hood covering the length of the slaking zone of the hydrator.

In these simulations, illustrated on FIGS. 1 to 3, the semi cylinder represents the upper half of the hydrator, namely the part of the hydrator located above the lime bed.

Such upper half of the hydrator is connected to an extraction hood that will evacuate the water steam towards the bag filter (not represented).

The bag filter presents the same section than the extraction hood to which it is connected.

Three situations have been considered.
1. small extraction hood section located at the end of the hydrator (FIG. 1).
2. small extraction hood section located at the center of the hydrator (FIG. 2).
3. extraction hood covering the length of the slaking zone of the hydrator (FIG. 3).

The results show that in situation 1 (FIG. 1), the water steam presents very long flow path which forces the water steam to remain in the hydrator in close contact with the lime bed for a non-negligible period of time before being evacuated through the bag filter. During this period of time, the water steam will interfere with the slaking of quicklime, preventing therefore to precisely control the hydration process.

Situation 2 (FIG. 2) presents better results than situation 1 since it reduces the flow path of the water steam. However, the generated steam, even if less in contact with lime undergoing the slaking reaction, is still in contact with this latter.

Situation 3 (FIG. 3) is the best situation since generated steam is directly extracted before being in contact with lime in the slaking zone.

In conclusion, it is more desirable to dispose a bag filter along the major section of the hydrator so as to evacuate the water steam through a shorter and more vertical flow path as possible, avoiding therefore the presence of transversal flows that would lead to undesirable hydration.

Example 2

Highly porous slaked lime is industrially manufactured according to the present invention in a single stage hydrator measuring about 5.5 m in length and 2.1 m in diameter (only the hydrator tank), producing about 6 t/h of slaked lime and equipped with a bag filter. For this process, quicklime ($d_{98}$ of 3 mm) having a $t_{60}$ reactivity of less than 1 min is slaked with water at a water/quicklime ratio equal to 1.05 by weight, the water being fed at ambient temperature. The average moisture content of the raw hydrate, meaning the moisture content of the raw slaked lime at the exit of the hydrator and before a drying step, is equal to 21.3 wt. %. The extraction hood of the filter (contact zone between the hydrator and the filter) is located along the slaking zone, i.e. at a central position compared to the length of the hydrator. The raw hydrate is then transported and flash dried during a few minutes into a cage mill dryer in which some hot air is injected. Once dried the slaked lime product is separated from the air by a bag filter.

The resulting dried hydrated lime presents a yearly average BET specific surface area equal to 42.6 $m^2/g$ and a yearly average total BJH pore volume (pores up to 1000 Å) equal to 0.255 $cm^3/g$ is produced.

Example 3

A highly porous slaked lime is industrially manufactured according to the present invention in another single stage hydrator, significantly larger than the one of Example 2 as it is producing 9 to 10 t/h of slaked lime. This hydrator is also equipped with a bag filter, the extraction hood of which being also located along the slaking zone, i.e. at a central position compared to the length of the hydrator. For this process, quicklime ($d_{98}$ of 3 mm) having a $t_{60}$ reactivity of 1.3 min is slaked with water at a water/quicklime ratio equal to 1.0 by weight. The average moisture content of the raw hydrate, meaning the moisture content of the raw slaked lime at the exit of the hydrator and before a drying step, is equal to 24.2 weight %. The raw hydrate is then transported and flash dried during a few minutes into a cage mill dryer in which some hot air is injected. Once dried the slaked lime product is separated from the air by a bag filter.

The resulting dried hydrated lime presents a yearly average BET specific surface area equal to 41.4 $m^2/g$ and a yearly average total BJH pore volume (pores up to 1000 Å) equal to 0.3 $cm^3/g$ is produced.

Example 4

A highly porous slaked lime is industrially manufactured according to the present invention in a multi stages hydrator measuring about 5 m in length, producing about 3 t/h of slaked lime and equipped with a bag filter. The hydrator itself is composed of three superimposed stages that all have the same length. The quicklime and the water are both fed at the beginning of the first stage of the hydrator. Di-ethylene glycol is added to the slaking water at an amount of 0.3% by weight with respect to the total amount of quicklime. The extraction hood of the bag filter is located on the whole length of the hydrator. For this process, quicklime having a $t_{60}$ reactivity of 1.1 min is slaked with water at a water/quicklime ratio equal to 1.0 by weight, the water being fed at ambient temperature. The average moisture content of the raw hydrate, meaning the moisture content of the raw slaked lime at the exit of the hydrator and before a drying step, is equal to 25 weight %. The raw hydrate is then transported and flash dried during a few minutes into a pin mill dryer in which some hot air is injected. Once dried the slaked lime product is separated from the air by a bag filter.

The resulting dried hydrated lime presents a yearly average BET specific surface area equal to 39.7 $m^2/g$ and a yearly average total BJH pore volume (pores up to 1000 Å) equal to 0.195 $cm^3/g$ is produced.

Comparative Example 1

Quicklime hydration trials are performed at laboratory scale in a small laboratory scale pilot single stage hydrator measuring about 80 cm in length, presenting a diameter of about 25 cm and producing about 20 kg/h of slaked lime. In this hydrator, the quicklime and the slaking water are fed upstream of the hydrator and driven along the slaking direction up to the end of the hydrator by a shaft equipped with mixing paddle.

A first trial consists in producing a highly porous slaked lime according to the present invention by slaking quicklime with water at a water/quicklime ratio of 1.1 by weight and by extracting the steam generated during the slaking reaction along the slaking zone with the help of an extraction duct. The experiment goes very well and dried hydrated lime having a BET specific surface area equal to 40.6 m²/g and a total BJH pore volume (pores up to 1000 Å) equal to 0.179 cm³/g is produced.

Then, the extraction of the steam is shifted toward the end of the hydrator, all the other conditions being kept constant. This experiment has to be stopped due to almost continuous blockages of the extraction duct and lime feeding pipe. Indeed, in these conditions, the steam, that is mainly generated in the central part of the hydrator, has a long path to go to reach the extraction duct. Therefore, some of the steam does not go along this path but rather in the other direction and goes out of the reactor via the quicklime feeding point, leading to a regular plugging of the lime feeding point. Moreover, in order to suck better the steam via the extraction duct, the applied depression has to be increased, which also leads to the extraction of more dust (indeed, there is not only steam in the hydrator, but steam in which a non-negligible amount of slaked lime dust is in suspension), and thus to the plugging of the extraction duct at regular intervals (each 2 minutes approximately). Due to these difficult conditions, it was not possible to pursue the slaking process.

It should be understood that the present invention is not limited to the described embodiments and that variations can be applied without going outside of the scope of the appended claims.

The invention claimed is:

1. Process for manufacturing highly porous slaked lime having a high specific surface area of at least 30 m²/g and a high pore volume, the high pore volume being comprised by pores with a diameter less than 1000 Angstroms, higher than or equal to 0.15 cm³/g, said process comprising a feeding step of quicklime, a feeding step of water in a feeding zone of a hydrator, a slaking step of said quicklime in a slaking zone of said hydrator and a maturation step in a maturation zone of said hydrator to form slaked lime, characterized in that said feeding step of quicklime and said feeding step of water are performed so as to obtain a water/quicklime ratio comprised between 0.8 and 1.3 by weight, the process further comprising a step of removing vapor generated during said slaking step, said step of removing vapor being performed over at least 90% of the length of said slaking zone to form a raw highly porous slaked lime being a high specific surface area and high pore volume slaked lime.

2. Process for manufacturing highly porous slaked lime according to claim 1, further comprising a drying step of said raw slaked lime to form a dried powdery high specific surface area and high pore volume slaked lime.

3. Process for manufacturing highly porous slaked lime according to claim 1, wherein said slaking step of said quicklime is performed into a single stage hydrator.

4. Process for manufacturing highly porous slaked lime according to claim 1, wherein said step of removing vapor is performed through a fabric filter.

5. Process for manufacturing highly porous slaked lime according to claim 1, wherein said step of removing vapor is performed along the entire length of the hydrator.

6. Process for manufacturing highly porous slaked lime according to claim 1, wherein the feeding step of quicklime is made by a weighing device, said weighing device comprising a conveyor belt, said conveyor belt allowing quicklime to fall into the hydrator.

7. Process for manufacturing highly porous slaked lime according to claim 6, wherein the feeding of water is carried out at a single point at the entry of the hydrator, onto the falling quicklime.

8. Process for manufacturing highly porous slaked lime according to claim 1, wherein said quicklime presents a reactivity towards water $t_{60}$, measured according to the European standard EN 459-2, equal to or greater than 15 seconds and equal to or lower than 10 minutes.

9. Process for manufacturing highly porous slaked lime according to claim 1, wherein said quicklime presents a particle size $d_{98}$ comprised between 90 μm and 10 mm.

10. Process for manufacturing highly porous slaked lime according to claim 1, wherein said water presents a temperature equal to or lower than 60° C.

11. Process for manufacturing highly porous slaked lime according to claim 1, wherein during said slaking step, lime is mixed and lifted by a shaft equipped with mixing paddles.

12. Process for manufacturing highly porous slaked lime according to claim 1, wherein the temperature in the hydrator is kept below 100° C.

13. Process for manufacturing highly porous slaked lime according to claim 11, wherein the manufacturing process of highly porous slaked lime is controlled by measuring the moisture of the raw slaked lime or the motor intensity of the shaft equipped with mixing paddles.

14. Process for manufacturing highly porous slaked lime according to claim 1, wherein the moisture content of the raw slaked lime is ranking between 15 and 30 weight % with respect to the weight of said raw slaked lime.

15. Process for manufacturing highly porous slaked lime according to claim 1, wherein the feeding step of water is a feeding step of water comprising additives, said additives including di-ethylene glycol or an alkali metal compound selected from the group consisting of alkali metal hydroxides, carbonates, hydrogencarbonates, and mixtures thereof.

* * * * *